United States Patent Office 2,951,223
Patented Aug. 30, 1960

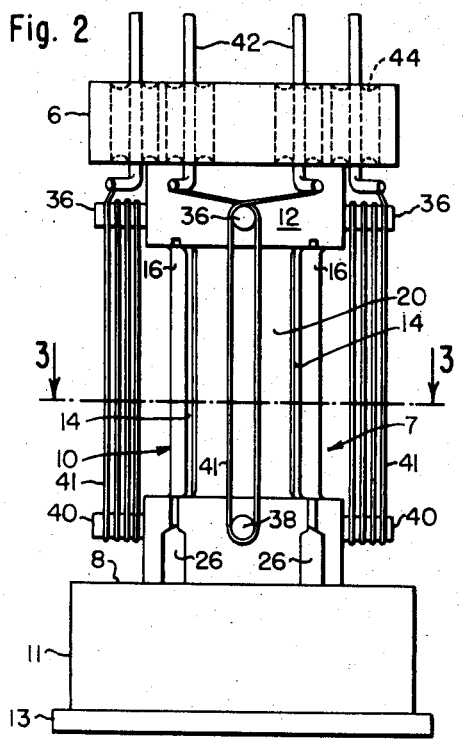
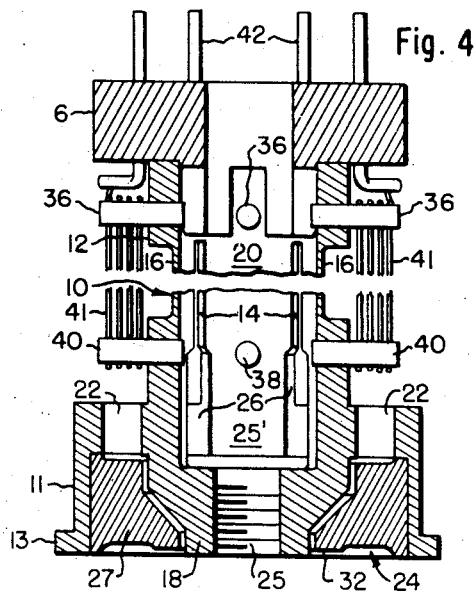
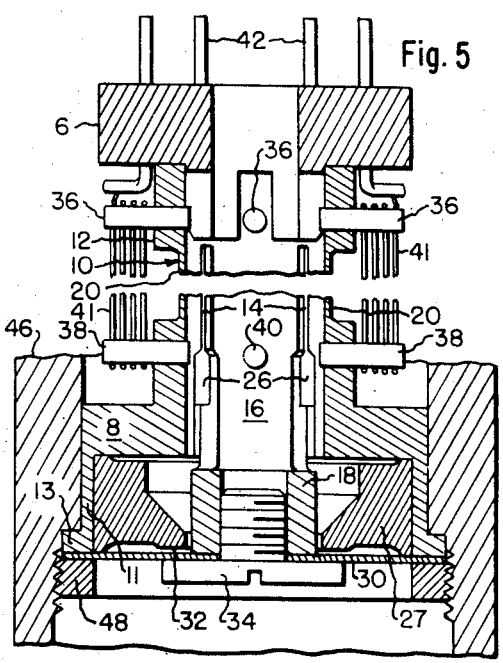
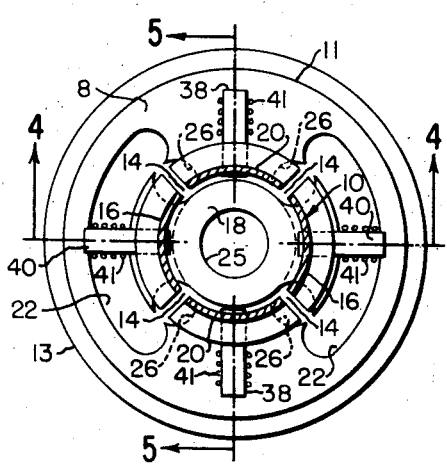

2,951,223

STRAIN GAGE TRANSDUCER

Yao Tzu Li, Lincoln, Mass. (Dynamic Instrument Company, 42 Carleton St., Cambridge, Mass.)

Filed Aug. 25, 1959, Ser. No. 837,565

8 Claims. (Cl. 338—4)

The present invention relates to transducers of the strain gas type. The invention is for the general purpose of the transducer described in our Patent No. 2,721,919, dated October 25, 1955, but comprises substantial improvements thereon. This application is a continuation-in-part of my prior application Serial No. 752,894 to be abandoned.

An object of the present invention is to provide a simple and accurate strain gage for accurately measuring small movements.

Other objects of the invention are to provide a strain gage transducer with substantially complete compensation for temperature variations; and also to provide for accurate pressure measurements.

With these objects in view the invention comprises the transducer hereinafter described and particularly defined in the claims.

In the accompanying drawings

Fig. 2 is a side elevation of the preferred device;

Fig. 3 is a sectional elevation on line 3—3 of Fig. 2;

Fig. 4 is a detail sectional elevation on line 4—4 of Fig. 3, and

Fig. 5 is a detail sectional elevation, similar to Fig. 4 but on line 5—5 of Fig. 3, with parts showing the preferred mounting on an enlarged scale and unit.

Figure 1:
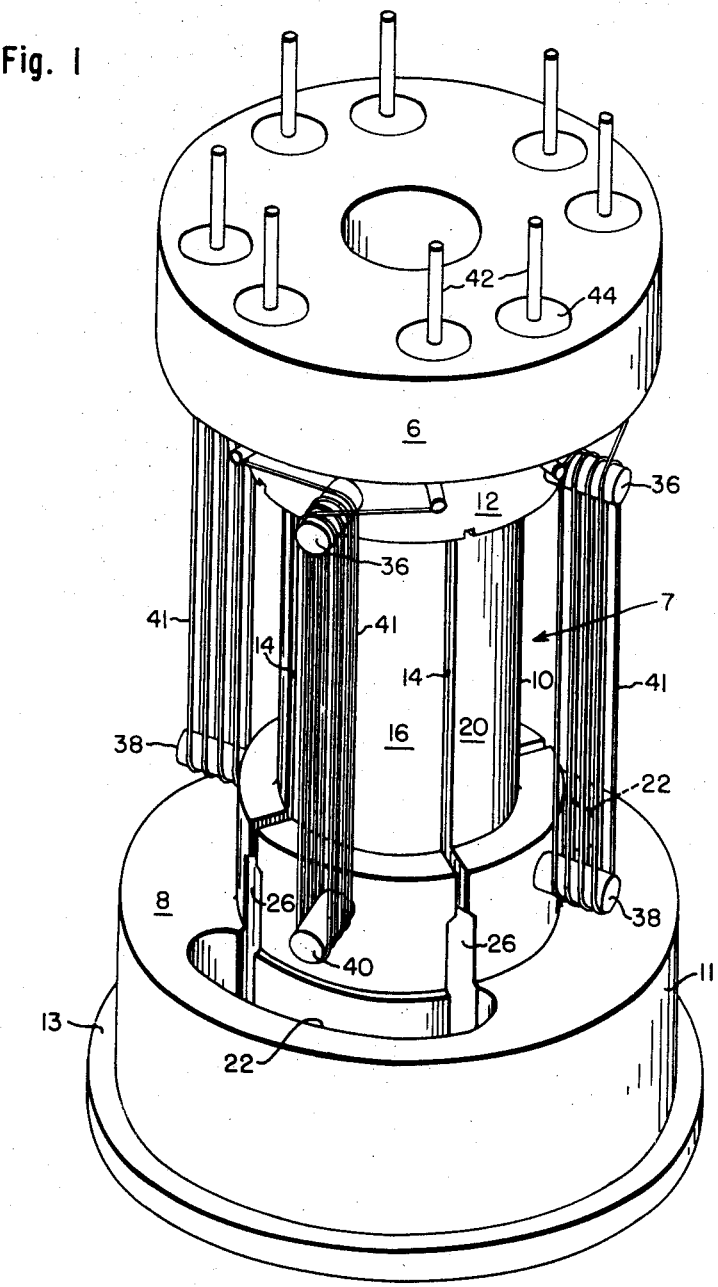
Fig. 1 is an isometric view of the prefered form of strain gage transducer according to the present invention.

The transducer shown in the accompanying drawings comprises an upper cap 6 and a body member indicated generally at 7. The body 7 comprises a lower base member 8 and a slit tube 10. The base 8 has an outer cylindrical skirt portion 11 formed with a bottom flange 13. The upper end of the tube is formed with a cylindrical flange 12 below the cap 6. The slitting of the tube is accomplished by four longitudinal cuts 14 extending lengthwise of the tube up to the bottom edge of the flange 12. By these cuts there are formed two pairs of diametrically opposed longitudinal fingers. Thus there is a pair of fingers 16 which extend throughout the length of the tube and terminate in a central ring or bushing 18. There is another pair of opposed fingers 20 which terminate at the lower end in an integral connection with the base 8. The upper part of the base is formed with arcuate slots 22 to allow the fingers 16 to extend downwardly to connect with the bushing 18. The bushing is free to move up and down through a cavity 24 in the base 8.

The body member 7 (comprising the base 8, the tube 10 and the upper flange 12) is preferably machined from a single block of metal. To this end the external shape of the body is determined by a suitable turning operation. The central opening 25 of the tube 10 may be drilled out. The opening is preferably of larger diameter at the upper end of the tube as indicated at 25' so that the tube there has a relatively thin wall. The annular cavity 24 is then drilled or milled out of the base.

A drill or end mill is then run up through the body at the four positions 26 which are spaced 90°. The holes thus made separate the fingers 16 and 20 at their lower ends. The longitudinal cuts 14 are made in the tube from the holes 26 up to the flange 12.

At this time there are formed the four fingers, all of which are attached to the base 8 and the bushing 18. To separate the fingers 16 from the base 8, the arcuate slots 22 are milled out. This leaves the pair of fingers 20 still attached to the base 8, and all four fingers remain attached to the bushing 20. To separate the fingers 20 from the bushing 18, a drill having the shape 26 may be swung in two 90° arcs at a level such that its upper end is only slightly above the upper end of the bushing 18. Thus at their lower ends the fingers 16 are attached only to the bushing 18, and the fingers 20 are attached only to the base 8, while all four fingers remain integrally attached at their upper ends to the flange 12.

The sequence of mechanical operations may be changed, or different operations may be used to form the transducer.

A plug member 27 of annular form is then pressed into the cavity 24 and is held by engagement with the inner wall of the skirt 11. The inner diameter of the plug 27 is only slightly larger than the outer diameter of the bushing 18, so that the latter is free to move longitudinally within the plug with slight clearance. The bushing 18 is normally flush with the bottom flange 13 of the base. A diaphragm 30, shown as a flat plate, may be secured to the bushing 18 as indicated in Fig. 5. The plug 27 has an inner bottom surface 32 spaced slightly above the normal diaphragm position to serve as a stop for the diaphragm. A screw 34 secures the diaphragm to the bushing and has a head large enough to back up the diaphragm when it engages the stop surface 32.

Extending outwardly from the flange 12 are four sapphire pins 36, one above each of the fingers of the tube. Near the bottom of the tube, two sapphire pins 38 extend outwardly from the fingers 20 and two pins 40 extend outwardly from the fingers 16, the pins 38 and 40 being directly below corresponding pins 36.

Strain gage wires 41 are wound on the four pairs of fingers, namely between pins 36 and 38 and between pins 36 and 40. These are wound in a conventional manner and the ends of the loops are taken out to terminals 42 which extend through glass bushings 44 in suitable openings in the cap 6. Preferably the terminals 42 are eight in number so that there is one terminal for each end of each strain wire loop. External connections may be made to the terminals 42 in the conventional manner, usually so that the strain wires form a bridge circuit.

In the preferred connections the windings 41 on opposed fingers form two diagonally opposite arms of the bridge and the other two windings form the other two diagonally opposite arms.

In Fig. 8 is shown a mounting of the apparatus for use as a pressure measuring device. The base 8 is provided with the small flange 13 which is conveniently received in a mounting tube 46. The flange 13 and the outer edge of the diaphragm 30 may be secured within the tube by any suitable means indicated as a nut 48.

In operation, assuming that the apparatus is to be used for measurement of pressure within the bottom part of the tube 46, it will be seen that an increase of pressure causes an upward motion of the diaphragm and a force is therefore applied to the bushing 18 and the fingers 16. This results in a compression of the fingers 16 and since the force is transmitted to the flange 12, the fingers 20 will be elongated. The result is that the strain gage windings wound on the fingers 16 will have their tension relaxed while those wound on the fingers 20 will have their tension increased. This will result in an unbalance of the bridge which will give an electrical indication of the extent of movement of the diaphragm. Upon movement of the diaphragm in the opposite direction, the tension on the wires wound on the fingers 16 will increase and the tension on the other wires will be relaxed, thereby giving an indication on the opposite direction.

The construction herein shown is also applicable to the use of bonded strain gages in place of the unbonded strain gages shown in the drawings. It is only necessary to adhere the bonded strain wires to the outer surfaces of the individual fingers 16. The application of bonded strain wires by adhesion to metal surfaces is well known to those skilled in the art. The terminals of the bonded gages may be brought out in the same manner as shown for the unbonded wires. The strain gages are subjected to the longitudinal strains (i.e., changes in length) of the individual fingers, in a similar manner to the action of the strains on the unbonded gages.

Temperature changes affect all four fingers equally and hence no indications are affected by temperature variations. It will be observed that one of the principal features of the invention is that there are four integral mechanical arms to respond to the force applied to the unit, and each mechanical arm is in parallel with an electrical strain gage winding.

It will be observed that the invention is not limited to the use of four fingers, but may comprise any even number, half of which are connected to the outer base member 8, while the other half are connected to the inner base member or bushing 18. Four fingers are however preferred, not only for ease of manufacture, but also to accommodate the four arms of the bridge.

Having thus described the invention, I claim:

1. A strain gage transducer comprising a member having a tubular end portion and an even number of fingers extending longitudinally therefrom, a base member to which alternate fingers are connected, a second base member to which all other fingers are connected, means for mounting the base members to permit relative longitudinal movement between them, and an unbonded strain gage wire wound between each finger and the tubular end portion.

2. A strain gage transducer comprising a tubular member slit longitudinally to form an even number of fingers, at least four, said fingers being integrally attached to an unslit end portion of the member, a base member attached to alternate fingers and a second base member attached to all other fingers at the end of the tubular member opposite the unslit portion, means for mounting the base members for relative longitudinal movement and an unbonded strain gage wire wound between each finger and the unslit end portion of the tubular member.

3. A strain gage transducer comprising a tubular member slit longitudinally to form an even number of fingers, at least four, said fingers being integrally attached to an unslit end portion of the member, a generally cylindrical base member connected to the ends of alternate fingers opposite the unslit portion, a bushing member connected with the ends of the other fingers, means for mounting the base member and bushing member for relative longitudinal movement and an unbonded strain gage wire wound between each finger and the unslit end of the tube.

4. A strain gage transducer comprising a tube slit longitudinally to form four fingers connected to an unslit end portion of the tube, a generally cylindrical base member integrally connected to two opposed fingers at the end of the tube opposite the unslit portion, a central bushing member integrally connected to the other two fingers, means for mounting the base and bushing members to permit relative longitudinal movement between them, and an unbonded strain gage wire wound between each finger and the unslit end portion of the tube.

5. A strain gage transducer comprising a member having a tubular end portion and an even number of fingers extending longitudinally therefrom, a base member to which alternate fingers are connected, a second base member to which all other fingers are connected, means for mounting the base members to permit relative longitudinal movement between them, and a strain gage mounted on each finger and subjected to the longitudinal strains thereof.

6. A strain gage transducer comprising a tubular member slit longitudinally to form an even number of fingers, at least four, said fingers being integrally attached to an unslit end portion of the member, a base member attached to alternate fingers and a second base member attached to all other fingers at the end of the tubular member opposite the unslit portion, means for mounting the base members for relative longitudinal movement, and a strain gage mounted on each finger and subjected to the longitudinal strains thereof.

7. A strain gage transducer comprising a tubular member slit longitudinally to form an even number of fingers, at least four, said fingers being integrally attached to an unslit end portion of the member, a generally cylindrical base member connected to the ends of alternate fingers opposite the unslit portion, a bushing member connected with the ends of the other fingers, means for mounting the base member and bushing member for relative longitudinal movement, and a strain gage mounted on each finger and subjected to the longitudinal strains thereof.

8. A strain gage transducer comprising a tube slit longitudinally to form four fingers connected to an unslit end portion of the tube, a generally cylindrical base member integrally connected to two opposed fingers at the end of the tube opposite the unslit portion, a central bushing member integrally connected to the other two fingers, means for mounting the base and bushing members to permit relative longitudinal movement between them, and a strain gage mounted on each finger and subjected to the longitudinal strains thereof.

References Cited in the file of this patent

UNITED STATES PATENTS

| | | |
|---|---|---|
| 2,783,342 | Statham | Feb. 26, 1957 |
| 2,789,190 | Statham | Apr. 16, 1957 |
| 2,840,675 | Di Giovanni | June 24, 1958 |